United States Patent [19]

Hubred

[11] Patent Number: 4,563,213
[45] Date of Patent: Jan. 7, 1986

[54] EXTRACTION AND STRIPPING COBALT VALUES

[75] Inventor: Gale L. Hubred, Richmond, Calif.

[73] Assignee: Chevron Research Company, San Francisco, Calif.

[21] Appl. No.: 637,652

[22] Filed: Aug. 2, 1984

Related U.S. Application Data

[63] Continuation of Ser. No. 422,816, Sep. 24, 1982.

[51] Int. Cl.[4] ............................................. C22B 23/00
[52] U.S. Cl. ...................................... 75/119; 423/139; 423/144; 204/112
[58] Field of Search ................. 423/139, DIG. 14, 24, 423/144; 75/119, 101 BE; 204/112

[56] References Cited

U.S. PATENT DOCUMENTS

| | | |
|---|---|---|
| 3,988,151 | 10/1976 | Skarbo ................................. 423/24 |
| 4,083,915 | 4/1978 | Hubred et al. ...................... 423/139 |
| 4,152,396 | 5/1979 | MacKay et al. .................... 423/139 |
| 4,258,016 | 3/1981 | Siemens ............................... 423/139 |

FOREIGN PATENT DOCUMENTS 1322532  7/1973  United Kingdom ................. 423/24

OTHER PUBLICATIONS

Agarwol et al., E/MJ, Dec. 1976, pp. 74–78.
"Solvent Extraction of Cobalt from Laterite-Ammoniacal Leach Liquors" by D. N. Nilsen et al., Bureau of Mines Report of Investigation/1980 (RI 8419).

*Primary Examiner*—John Doll
*Assistant Examiner*—Robert L. Stoll
*Attorney, Agent, or Firm*—S. R. La Paglia; C. L. Hartman; V. J. Cavalieri

[57] ABSTRACT

A process is disclosed for extracting cobalt values from an aqueous solution containing cobalt and other metal values and stripping the resulting organic solution with an aqueous ammoniacal solution.

8 Claims, 2 Drawing Figures

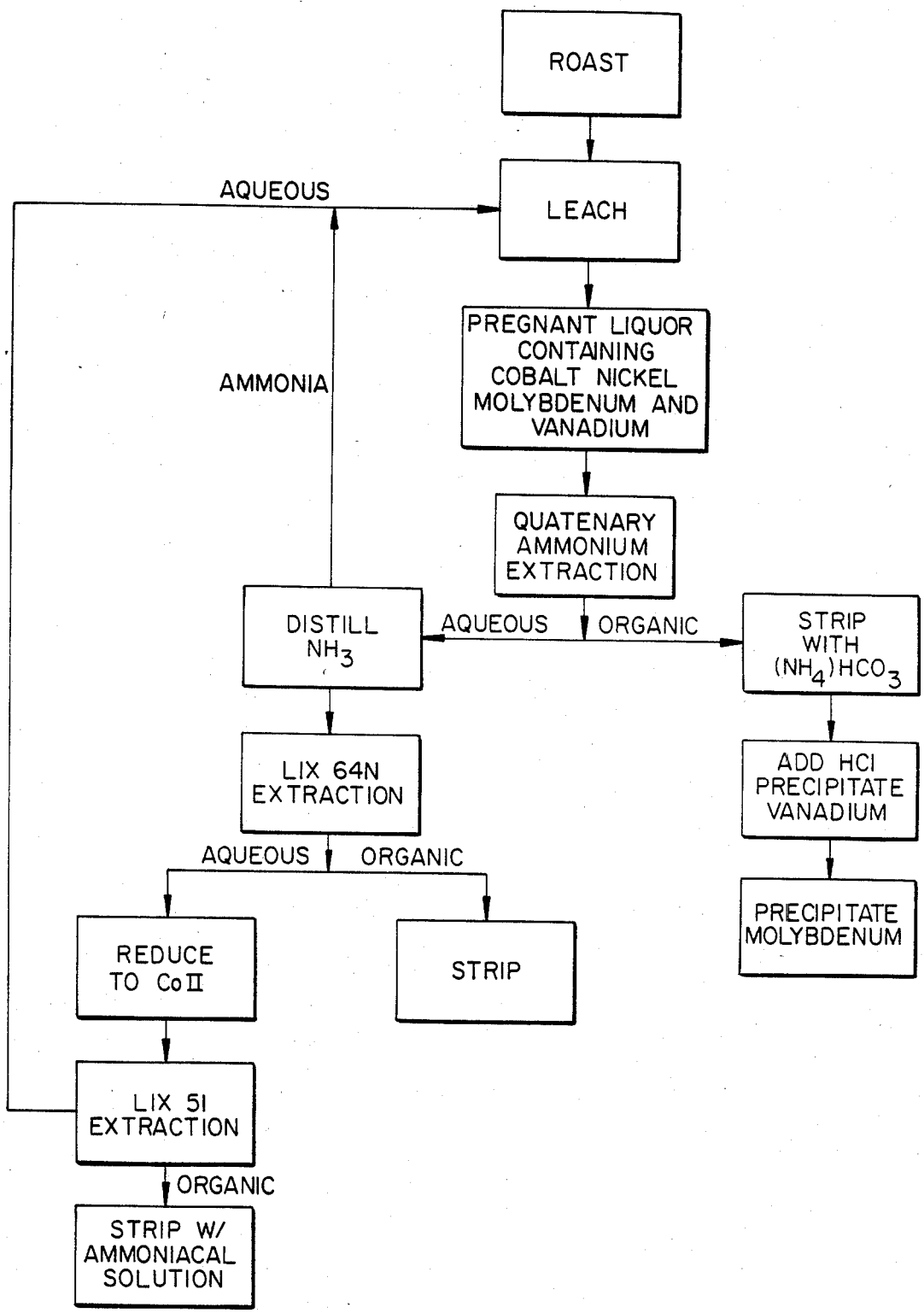
FIG._1.

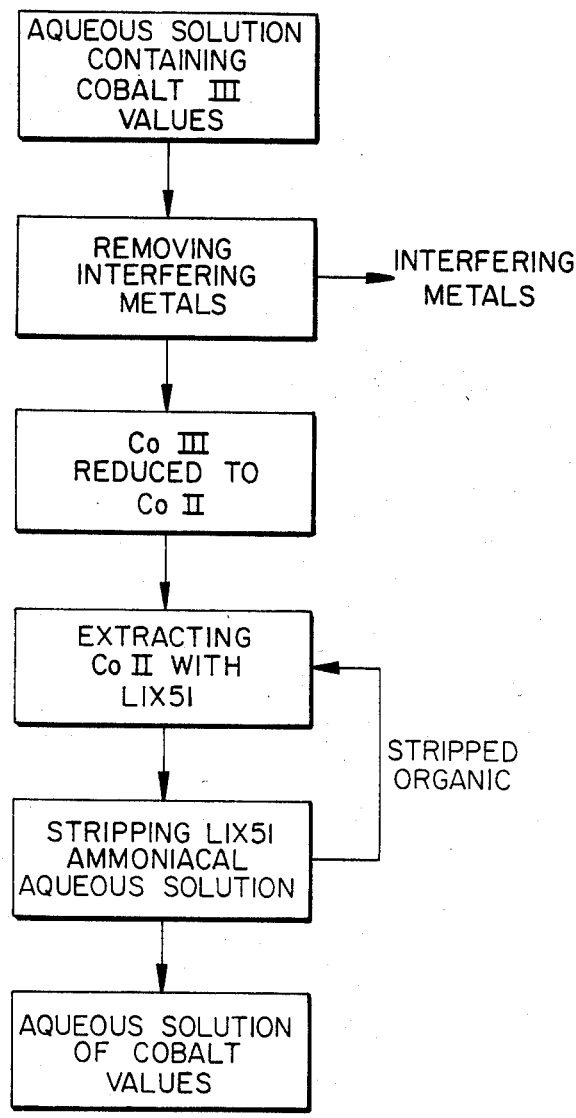
FIG._2.

EXTRACTION AND STRIPPING COBALT VALUES

This is a continuation of application Ser. No. 422,816, filed Sept. 24, 1982.

BACKGROUND OF THE INVENTION

This invention relates to extracting and purifying cobalt from aqueous solutions containing cobalt and other metal values.

There are many hydrometallurgical processes for extracting metal values from ores that contain several metals, such as copper, nickel and particularly cobalt, in which the metals are first leached from ores and then are subjected to successive separations to separate the metals values. In some processes, cobalt is placed into organic phase by an organic extractant, stripped from the organic phase by an aqueous acid and the metal is recovered by electrowinning. An example of this type of process is disclosed in *Chemical Engineering*, Nov. 3, 1980, pp. 43–45. Similar processes are disclosed in *Bureau of Mines Report of Investigation*/1980, RI 8419 and U.S. Pat. No. 4,083,915.

U.S. Pat. No. 4,258,016 teaches the use of liquid ion exchange using LIX 51 ®, a commercial mixture of betadiketones, as organic extractant, and the use of sulfuric acid to strip the pregnant LIX 51 of cobalt to create a suitable cobalt electrolyte. Cobalt values are stripped from the organic extractant by sulfuric acid.

U.S. Pat. No. 3,988,151 discloses a process to recover copper and nickel values from an aqueous solution containing both values by first extracting copper into an organic phase and then extracting the nickel into an organic phase, and subsequently stripping the nickel containing organic solution with an aqueous strip solution of ammonia and carbon dioxide.

Cobalt was considered incompatible with this particular system since it was believed that cobalt poisoned LIX 64N ®.

A portion of the ammonia tends to transfer into the organic phase with the cobalt values. This causes a loss of ammonia from the aqueous system. An equivalent amount of ammonia must be added to the leach system to make up for this loss. In addition, the ammonia present in the organic phases causes consumption of acid during the acid stripping step, beyond that which is required to recover the cobalt. Both the ammonia loss and extra acid consumption constitute undesirable economic penalties. Furthermore, during such a process, various insoluble ammonium-containing salts, such as ammonium cobalt sulfate, can form and lead to significant operating problems.

A particularly attractive source of cobalt is spent hydroprocessing catalysts. Cobalt alone, or in combination with other metals, particularly molybdenum, is frequently a component of hydroprocessing catalysts. Due to the high cost of cobalt, and the uncertainty of continuing supply, it is highly desirable to recycle cobalt recovered from deactivated hydroprocessing catalysts to manufacture of fresh catalysts. Since cobalt is usually placed in the catalyst support, as a soluble solution of a cobalt salt, such as cobalt oxide or cobalt carbonate, the isolation of pure cobalt metal, by electrowinning, is an unneeded step. The soluble salt of the metal is a preferable source of cobalt for the production of catalysts.

Hydrocarbonaceous feedstocks, for example crude oils, vacuum and atmospheric residua, topped crudes and the like, are frequently contaminated with metals, including nickel, vanadium and iron, bound to organic molecules, for example, phorphorins, and are removed by contacting the feedstock with hydroprocessing catalysts. During hydrodemetalation, the metals tend to deposit on the surface of the catalyst pores, eventually plugging them and deactivating the catalyst. Such deactivated catalysts can be viewed as an ore that is very rich in cobalt, nickel, vanadium and molybdenum.

It would be advantageous to hydroprocessors and hydroprocessing catalyst manufacturers if a process were found for extracting cobalt from aqueous solutions without the disadvantageous features of the prior art.

SUMMARY OF THE INVENTION

This invention provides a process for extracting and stripping cobalt values from aqueous solutions comprising:

(a) removing other interfering metals extractable from a first aqueous solution;

(b) reducing cobalt values to the divalent state;

(c) extracting the reduced cobalt values with an organic cobalt extractant; and (d) stripping the cobalt values from the organic extractant with a second aqueous solution containing ammonia and ammonium salts.

BRIEF DESCRIPTION OF THE DRAWING

FIG. 1 shows a flow diagram of a process to remove metals from spent hydroprocessing catalysts.

FIG. shows a detailed flow diagram of a process to remove cobalt from an aqueous solution that also contains interfering metals.

DETAILED DESCRIPTION OF PREFERRED EMBODIMENTS OF THE INVENTION

The Metals Containing Solution

During hydrometallurgical processing, cobalt can be in aqueous solution with other metal ions. The cobalt values may be removed by liquid liquid extraction, by use of organic solutions containing organic cobalt extractants. For ease of operation of the process, it is frequently desirable to remove any other metal ions from the aqueous solution that might be coextracted with the cobalt values. Such metal ions are herein defined as "interfering metals". Interfering metals can include copper or nickel and the like.

Cobalt ores, whether natural or artificial, tend to also contain nickel. In particular, spent hydroprocessing catalysts, which can be viewed as an artificial ore contain both metals. Cobalt is a catalytic metal and nickel is a contaminant metal frequently catalytically removed from oil. Leaching such spent catalysts creates an aqueous solution of both nickel and cobalt cations. One particularly good leaching system is an aqueous solution of ammonia [$NH_3$(aq) hereinafter ammonia] and an ammonium salt [$NH_4^+ \cdot X^-$(aq) hereinafter ammonium].

Extraction of Nickel

The organic nickel extractant may be, for example, one of several alpha-hydroxy oximes having the general formula:

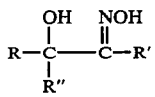

where R, R' and R" may be a variety of organic hydrocarbon radicals such as aliphatic and alkyaryl radicals. R" may also be hydrogen. Preferably, R and R' are unsaturated hydrocarbons or branched chain alkyl groups, containing from about 6 to 20 carbon atoms, R and R' are also preferably the same and, when alkyl, are preferably attached to the carbons substituted with the —OH and =NOH groups through a secondary carbon atom. It is also preferred that R" is hydrogen or unsaturated hydrocarbon or branched chain alkyl groups containing from about 6 to 20 carbon atoms.

Suitable oximes are disclosed for example by U.S. Pat. Nos. 3,224,873, 3,592,775, 3,455,680, 3,428,499, 3,276,863 and 3,197,274. Particularly suitable extractants comprise 2-hydroxy-4-nonyl-benzophenoxime which is the primary extractant in a composition also containing an alpha-hydroxy oxime sold by Henkel Corporation under the trade name LIX-64N ®; 8-diethyl-7-hydroxy-6-dodecanone oxime which is the primary extractant in a composition sold by Henkel Corporation under the trade name LIX-63 ®; and 2-hydroxy-4-dodecyl-benzophenoxime which is the primary extractant in a composition also containing an alpha-hydroxy oxime sold by Henkel Corporation under the trade name LIX-64 ®.

The preferred extracting agent is LIX-64N ®. This agent contains about 46 to 50% beta-hydroxybenzophenone oxime, and about 1 to about 2% of an aliphatic alpha-hydroxy oxime in a hydrocarbon diluent such as kerosene. This extracting agent provides nearly quantitative extraction of nickel and provides a very high degree of selectivity for nickel (II) over cobalt (III). If, for some reason, another interfering cationic metal ion was also present the present invention requires its extraction before the extraction of cobalt.

Extraction of Cobalt

The cobalt in an ammoniacal solution exposed to air will be oxidized to cobalt (III), which is difficult to extract. It must be reduced to the more easily extracted cobalt (II) form.

The cobalt organic extractant can be any organic complexing agent of cobalt (II) that forms stable cobalt complexes in an organic solvent. Suitable reagents for removing cobalt from the pregnant solution include oximes, diketones, and dioximes having suitable hydrocarbon substituents to render them less water soluble are satisfactory.

Cobalt (III) is generally reduced to cobalt (II) by contacting the cobalt (III) solution with cobalt metal, preferably cobalt shot. It is preferred that agitation be supplied to the cobalt shot bed during this step. Suitably, the cobalt shot bed is agitated by continuously introducing an inert gas such as nitrogen at the bottom of the column. Agitation results in a higher conversion of cobalt (III) to cobalt (II), reduces the time required for completing this step, and produces an overall greater extraction of the cobalt. Other means known to the art of reducing cobalt (III) are also satisfactory.

The cobalt (II) is then extracted with an organic cobalt extractant containing a beta-diketone. One such extractant is a beta-diketone of the formula

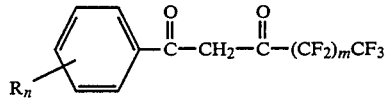

where n is 1 to 4, m is 0, 1 or 2 and R is an alkyl group of 1–25 carbon atoms. These compounds and their preparation are disclosed in U.S. Pat. No. 4,152,396, the disclosure of which is also incorporated herein by reference, and is sold under the trade name of LIX-51 ®.

The beta-diketone chelating metal extractant is dissolved in an alcohol and a hydrocarbon, such as kerosene. Advantageously, the alcohol contains about 10 carbon atoms, with isodecanol being preferred. A preferred hydrocarbon is kerosene containing about 12 to 15% aromatic hydrocarbons. Illustrative of this preferred hydrocarbon is Kermac 470B ®, which is marketed by Kerr-McGee. The ratio of beta-ketone chelating metal extractant to alcohol to hydrocarbon to be used is governed by considerations such as speed and completeness of phase separation, and the concentration of cobalt in the liquor to be extracted. When isodecanol and Kermac 470B ® are selected for use as the alcohol and the hydrocarbon, respectively, the optimum isodecanol concentration is about 15 volume %, with a concentration in the range of about 10 to 20 volume % being operative.

The maximum loading capacity of cobalt (II) on the 5% beta-ketone extractant is about 2.6 grams per liter. Beyond this level precipitation occurs in the organic phase. Sufficient cobalt extractant must be provided for the amount of cobalt present. Thus, it is preferred that the organic extractant solution for spent catalysts contains about 5 to 10 volume percent beta-ketone, about 15 volume percent isodecanol and about 75–85 volume percent Kermac 470B ®.

Suitably, the extraction step is carried out at a temperature in the range of from about room temperature to about 50° C., and is carried out in one or two stages. A one-stage extraction may be used.

The loading of cobalt (II) on the beta-ketone extractant is strongly pH dependent. Cobalt (II) begins to load just above about pH 4.5. In ammonia solution, cobalt and nickel loading is also inversely proportional to the solution ammonia concentration. Thus, removal of ammonia, by evaporation, from the leach liquor, prior to extraction of nickel values, aids metal extraction.

Conventionally, the organic phases containing cobalt (II) are stripped by acids, for example sulfuric acid, to create a cobalt containing electrolyte suitable for electrowinning. Another conventional method uses other metallic ions, for example, copper (II) or nickel (II) which are known to "crowd" the cobalt II from the LIX 64N extractant freeing the cobalt into an aqueous solution for electrolysis.

Cobalt Stripping

It has been discovered that ammonia can strip cobalt from the organic phase.

It is preferred that the strip solution be of ammonia and an ammonium salt. The strip solution formed is herein termed the second aqueous solution. Preferred concentrations are at least 0.5M in ammonium salt and it is preferred that the concentration of ammonia in solution be at least 150 grams per liter and that the solution have its pH adjusted to less than 12 and preferably about 10.

The anion used for the strip solution is not critical. It can be carbonate, sulfate, nitrate or other anion. Its choice is dictated by considerations of the use of the second aqueous solution, whether as a source for electrowinning cobalt, or for impregnating fresh catalyst support. For the latter use the preferred salt is ammonium carbonate. The solution formed after stripping is herein termed the cobalt-containing salt solution.

Cobalt can be recovered for use from the second aqueous solution by a variety of techniques, including direct precipitation of a cobalt-containing salt by evaporation of the solution, and electrowinning. The cobalt can be oxidized, by bubbling an oxygen-containing gas, for example, air, through the solution, producing $Co_3O_4$ which can be recovered. Cobalt metal can be recovered by direct reduction with hydrogen gas. If the cobalt is from spent hydroprocessing catalysts and is to be recycled, the second aqueous solution can be used to impregnate fresh catalyst support or can be used as a source of metals for comulled or cogelled catalyst supports.

In another embodiment of this invention cobalt and nickel are costripped from an organic solution of a suitable coextracting agent.

DETAILED DESCRIPTION OF THE DRAWING

FIG. 1 illustrates an embodiment for recovering metals from spent catalysts known to contain cobalt, nickel, molybdenum and vanadium. The catalyst is first roasted under conditions where the temperature is controlled to less than 600° C. The spent roasted catalyst is then leached at 90° C. until cobalt values in solution start to decrease. The pregnant liquor is then extracted with a quaternary amine, forming a first set of two streams: an organic stream containing molybdenum and vanadium, and an aqueous stream containing cobalt and nickel. The first organic stream is stripped with an aqueous solution of ammonium bicarbonate. Hydrochloric acid is added to the aqueous strip solution and ammonium metavanadate is precipitated. The volume of the solution is reduced and ammonium molybdate is precipitated.

Excess ammonia is removed from the first aqueous stream, by heating the solution. The solution, which is exposed to air insuring that cobalt is in the trivalent oxidation state, is extracted with LIX 64N ®, removing the nickel and creating a second set of two streams: an aqueous, containing cobalt and any impurities and an organic containing nickel. The second organic solution is stripped with sulfuric acid, forming an acidic nickel containing sulfate solution. The cobalt in the second aqueous stream is reduced over cobalt shot, and extracted with LIX 51 ®, thereby forming a third set of aqueous and organic streams.

The third aqueous stream is recycled to the leach step, enriched in ammonia removed from the ammonia distillation step. The third organic stream is stripped with solution of a solution of ammonia and ammonium carbonate.

FIG. 2 illustrates another embodiment of the present invention. An aqueous solution containing cobalt III values and interfering metal values is first processed to remove the interfering metal values. The cobalt III is reduced to cobalt II in solution. The cobalt II values are removed from the aqueous phase by contacting the aqueous phase with an organic phase containing LIX 51 ®. The cobalt values are removed from the organic solution by an aqueous ammoniacal strip solution, giving an aqueous solution of cobalt values.

EXAMPLE 1

This example illustrates the production of a cobalt (II) solution from an aqueous solution initially containing both nickel and cobalt.

Spent catalyst particles, from service in a hydrodesulfurization pilot plant, containing cobalt and molybdenum, as catalytic metals, were in contact with a feedstock containing high levels of vanadium and nickel, as contaminant metals. The catalyst particles were leached with aqueous ammonium carbonate/ammonia solution at a pH about 10.5. After heating the solution to evaporate enough ammonia so that ammonia plus ammonium equals about 25 grams per liter at a pH of 9, nickel was extracted by LIX-64N ® in kerosene. The solution was then passed through a column of cobalt shot and the raffinate from this column containing 2.975 grams per liter of cobalt is extracted with 5 percent by volume LIX-51 ® in 10 percent decanol and 85 percent Kermax at 50° C. The resulting organic solution was stripped with 2 molar ammonium carbonate solution in 15 molar ammonia solution that had its pH adjusted to 10.27 by addition of sulfuric acid. About 25 percent of the cobalt from the LIX 51 ® was removed during each contact with the ammonia strip. After several counter current extractions, the resulting cobalt (II) carbonate solution was evaporated to produce a cobalt containing brown powder, which is believed to be a mixed oxide, carbonate salt.

The cobalt (II) carbonate solution can be directly recycled to catalyst manufacture or can be processed to produce a cobalt product.

EXAMPLE 2

Various organic solutions containing cobalt in LIX-51 ® solution were stripped with aqueous solutions of ammonia and ammonium carbonate. The organic solutions were 5% LIX-51 ® 85% Kermax and 10% decane. The concentration of cobalt in the organic phase was 2.65 g/l in the 3M and 5M ammonia cases and 3.1 g/l in the 15M ammonia case. The volume ratio of organic (O)/aqueous (A) was varied. The results are tabulated in Table 1.

TABLE 1

COBALT STRIPPING WITH AMMONIA SOLUTION
ORGANIC PHASE: 5% LIX-51, 85% KERMAX
AND 10% DECANE; TEMPERATURE 50° C.
ORGANIC CONCENTRATION/AQUEOUS CONCENTRATE
(g Co/LITER)

| Stripping Solutions | | | | |
|---|---|---|---|---|
| $NH_3$ M | 15 | 5 | 5 | 3 |
| $(NH_4)_2CO_3$ M | 2 | 2.5 | 2.5 | 1.5 |
| Kjeldahl $NH_3$ (g/l) | 206 | | | |
| $pH_{RT}$ | 10.27 | 10.58 | 10.4 | 10.27 |
| Volume Phase Ratio (O/A) | | | | |
| 15/1 | 2.72/0.42 | — | | |
| 10/1 | 2.69/0.31 | 2.98/1.21 | 3.0/1.05 | 3.08/0.23 |
| 5/1 | 2.45/0.51 | 2.94/0.82 | 2.98/0.81 | 3.04/0.31 |
| 2/1 | 2.28/0.53 | 2.83/0.52 | 2.86/0.47 | 3.02/0.16 |
| 1/1 | 2.00/0.97 | 2.84/6.32 | 2.82/0.28 | 3.01/0.12 |
| 1/2 | 1.74/0.30 | 2.67/0.21 | 2.77/0.17 | 2.86/0.081 |
| 1/5 | 1.49/0.23 | 2.45/0.12 | 2.52/0.094 | 2.88/0.045 |

TABLE 1-continued

COBALT STRIPPING WITH AMMONIA SOLUTION
ORGANIC PHASE: 5% LIX-51, 85% KERMAX
AND 10% DECANE; TEMPERATURE 50° C.
ORGANIC CONCENTRATION/AQUEOUS CONCENTRATE
(g Co/LITER)

| | | | | |
|---|---|---|---|---|
| 1/10 | 1.32/0.15 | 2.34/0.077 | 2.97/0.015 | 2.82/0.028 |
| 1/15 | 1.05/0.22 | 2.06/0.06 | 2.61/0.03 | 2.73/0.025 |

The data indicate that the cobalt goes into the aqueous phase from the organic phase more readily for the 15M ammonia case than for either the 5M or 3M cases. Therefore, at greater ammonia concentrations more cobalt is stripped if the pH is held at about 10.5.

What is claimed is:

1. A process for recovering cobalt values from an aqueous solution containing nickel comprising:
   (a) removing nickel from a first aqueous solution containing cobalt (III) values by extracting said nickel with an alpha-hydroxy oxime;
   (b) reducing cobalt (III) values to cobalt (II) values;
   (c) extracting the resulting cobalt (II) values with a beta-diketone chelating metal extractant;
   (d) stripping the cobalt values from said beta-diketone chelating metal extractant at a pH in the range of between 10 and 12 with a second aqueous solution containing ammmonia and ammonium carbonate, to form a cobalt-containing aqueous solution.

2. The process of claim 1 wherein the organic nickel extractant is an alpha-hydroxy oxime and the cobalt extractant is a beta-diketone chelating metal extractant of the formula

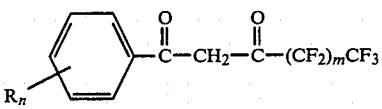

where n is 1 to 4, m is 0, 1 or 2 and R is an alkyl group of 1 to 25 carbon atoms.

3. The process of claim 1 wherein said first aqueous solution contains ammonia and including adjusting the ammonia content of said first solution prior to step (a).

4. The process of claim 1 including precipitating a cobalt carbonate from said cobalt containing carbonate solution.

5. The process of claim 4 including calcining said cobalt carbonate to a cobalt oxide.

6. The process of claim 1 including electrowinning cobalt metal from said cobalt-containing carbonate solution.

7. The process of claim 1 including recovering cobalt metal from said cobalt-containing carbonate solution by direct hydrogen reduction.

8. The process of claim 1 wherein said second aqueous solution of ammonia and ammonium carbonate contains at least 150 grams of ammonia per liter of solution and the pH of the solution is in the range of between 10 and 12.

* * * * *